United States Patent [19]
Cooke

[11] 3,724,503
[45] Apr. 3, 1973

[54] FLOW MEASUREMENT AND CONTROL

[75] Inventor: Gerhart M. Cooke, Napa, Calif.

[73] Assignee: Aeroquip Corporation, Jackson, Mich.

[22] Filed: Apr. 30, 1971

[21] Appl. No.: 138,914

[52] U.S. Cl. ................. 138/45, 138/46, 73/213
[51] Int. Cl. ............................................. F17d 1/10
[58] Field of Search ............. 138/37, 45, 46; 73/213

[56] References Cited

UNITED STATES PATENTS

| | | | |
|---|---|---|---|
| 2,625,008 | 1/1953 | Crook | 138/45 X |
| 2,546,673 | 3/1951 | Mattix et al. | 138/45 |
| 2,791,239 | 5/1957 | Mason | 138/45 |
| 2,933,922 | 4/1960 | Davis | 138/45 X |
| 2,434,835 | 1/1948 | Colley | 138/45 |
| 2,598,208 | 5/1952 | Bailey | 138/45 |
| 3,443,609 | 5/1969 | Wehren | 138/45 X |

Primary Examiner—Meyer Perlin
Assistant Examiner—Ronald C. Capossela
Attorney—Gregg, Hendricson & Caplan

[57] ABSTRACT

A device for controlling fluid flow in accordance with measured flow. A housing with a passage therethrough is provided internally with movable control members and control means therefor extending externally of the housing to thus define a variable venturi or variable flow nozzle for controllably restricting fluid flow through the passage. A pair of apertures in the housing communicating with the passage, one at or near the throat of the venturi or flow nozzle and one upstream thereof, are adapted for connection to a differential pressure indicating means, which may also include recording and controlling functions. A capacity curve is employed with the indicated differential pressure to determine the proper throat opening for any desired fluid flow.

4 Claims, 8 Drawing Figures

PATENTED APR 3 1973 3,724,503

INVENTOR.
GERHART M. COOKE
BY
Gregg, Henderson & Caplan
ATTORNEYS

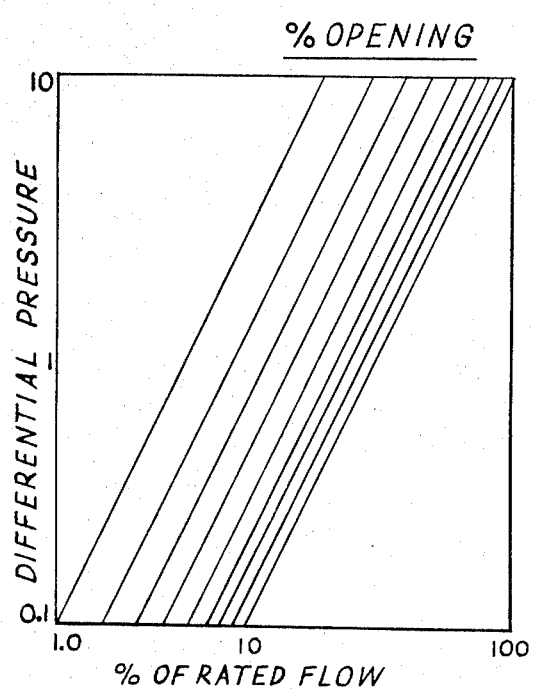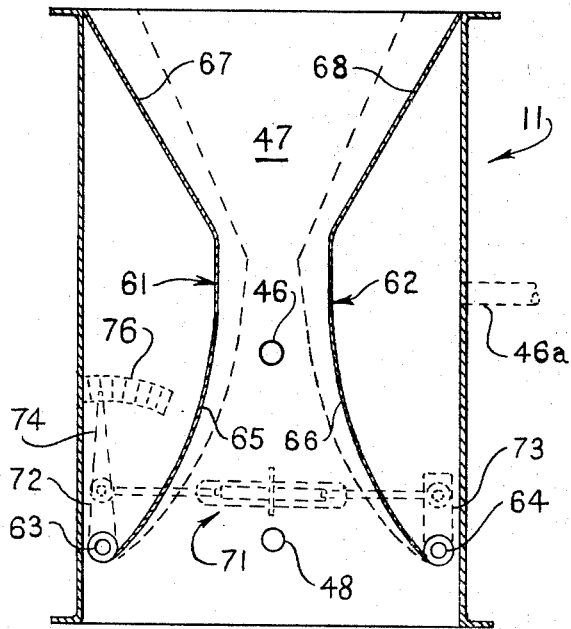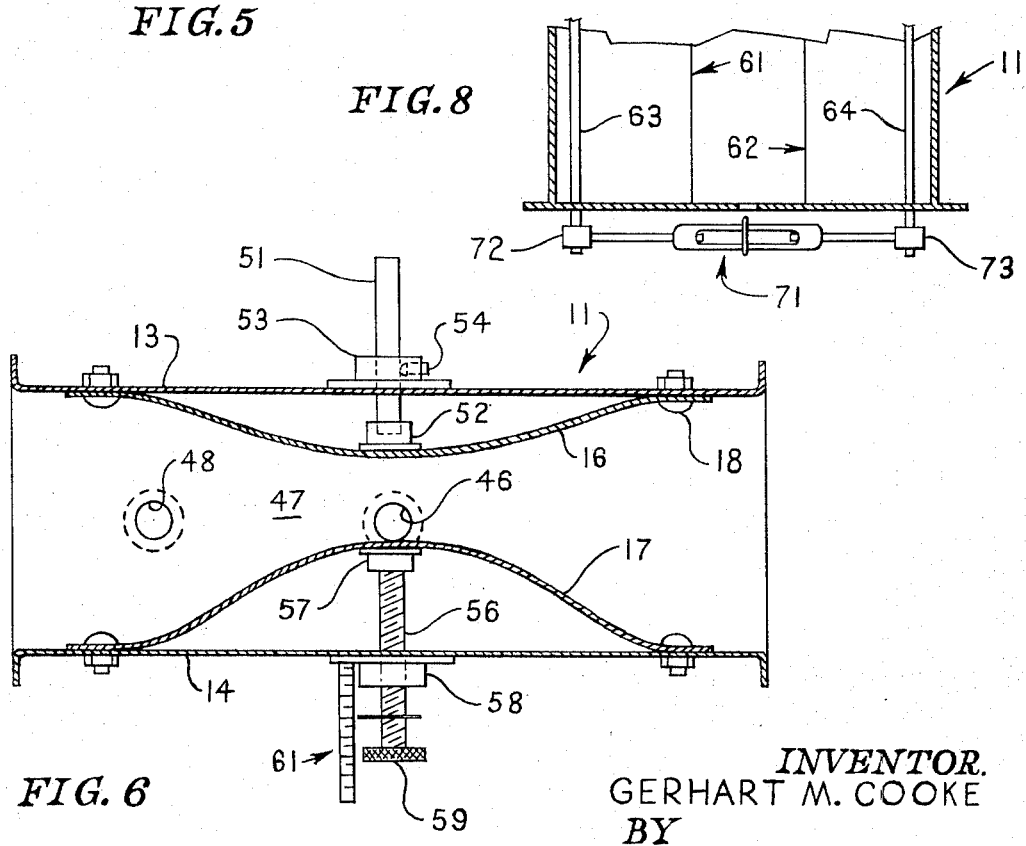

FLOW MEASUREMENT AND CONTROL

BACKGROUND OF INVENTION

The control of fluid flowing in conduits is conventionally accomplished by the utilization of devices such as valves or dampers which basically provide for variably constricting the passage. Certain flow control devices have been developed for establishing a smoothly varying passage contour while varying the passage cross section. Reference in this respect is made, for example, to U.S. Pat. No. 2,788,020 to Davie, Jr., and U.S. Pat. No. 2,791,240 to Storms, Jr. et al.

In many applications such as, for example, in heating and air conditioning systems it is necessary to adjust the flow of fluid to achieve some particular desired flow, possibly in separate portions of the system. Again with regard to air conditioning systems, flow is normally controlled by one or more dampers which are initially adjusted to some position of restricted flow, the flow is then measured, the dampers are readjusted, the flow is again measured and this procedure repeated until desired flow is attained. It will be recognized that this manner of flow control is tedious and time consuming.

The present invention provides a flow control device incorporating flow measurement whereby the flow is measured as it is controlled and thus but a single control operation is necessary to achieve a desired fluid flow. The present invention is particularly applicable to air conditioning systems but is in no way limited thereto.

SUMMARY OF INVENTION

The present invention is embodied as an open ended housing having a passage therethrough within which there is comprised a variable venturi or variable flow nozzle. The housing is provided with an aperture at or near the throat of the variable constriction and another aperture upstream thereof with such apertures being adapted for connection to differential pressure indicating means.

The variable passage of the present invention is preferably defined by control members such as movable plates disposed one on each side of the passage with control means engaging the plates at a passage throat and extending externally of the housing for controlled movement to laterally vary the opening of the passage. The invention is operated by applying indicated or measure differential pressure to capacity curves from which may be read the rate of flow for the particular passage opening. The opening is then varied to the point at which the measured or indicated differential pressure produces the desired rate of flow as indicated by the capacity curve.

DESCRIPTION OF FIGURES

The present invention is illustrated as to particular preferred embodiments thereof in the accompanying drawings, wherein:

FIG. 5 is a plot of capacity curves as may be employed with the present invention;

FIG. 6 is a central sectional view in elevation through an alternative embodiment of the present invention;

FIG. 7 is a plan view of an alternative embodiment of the invention with the top removed; and FIG. 8 is a partial end elevation of the embodiment of the invention illustrated in FIG. 7.

DESCRIPTION OF PREFERRED EMBODIMENTS

Considering now a preferred embodiment of the present invention and referring to FIGS. 1 to 4 of the drawings, it will be seen that the present invention may be provided as an open ended rectangular housing 11 having side walls 12 and top and bottom walls 13 and 14 respectively. The housing 11 may be provided with flanged ends as illustrated in order to facilitate connection of the housing in a fluid flow system such as, for example, an air conditioning system. This housing 11 is adapted to accommodate the flow or passage of a fluid therethrough and the present invention is particularly directed to both the measurement of such flow and control over the volume thereof.

Figure 2:
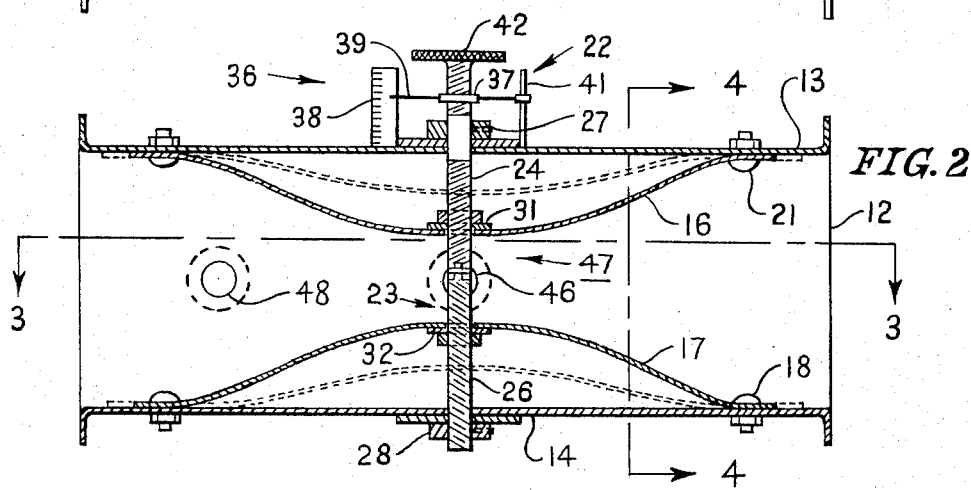
FIG. 2 is a longitudinal central section in elevation taken in the plane 2—2 of FIG. 1.
Figure 3:
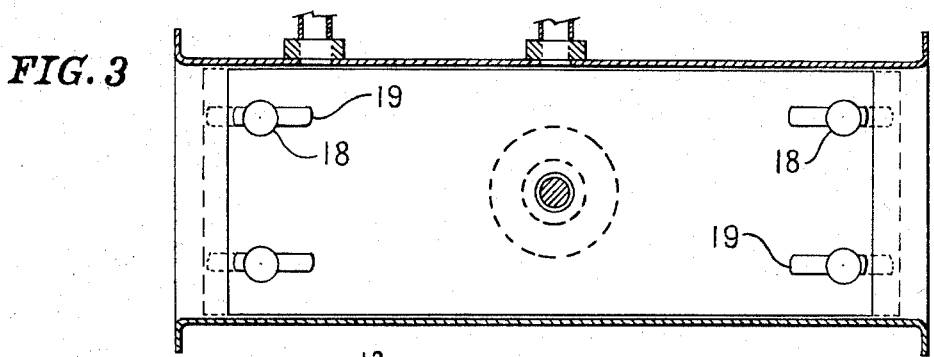
FIG. 3 is a central sectional view taken in the plane 3—3 of FIG. 2.
Figure 4:
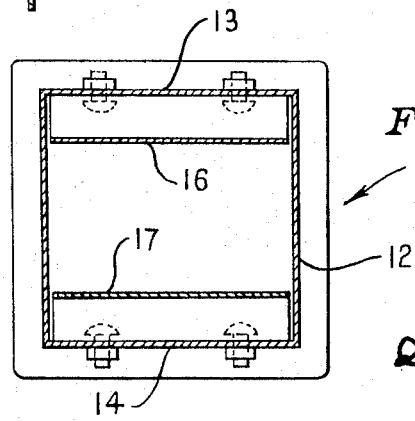
FIG. 4 is a transverse sectional view taken in the plane 4—4 of FIG. 2.

Within the housing 11 there are provided a pair of flexible plates 16 and 17 having the same width as the internal opening through the housing and disposed one against the top of the housing and one against the bottom thereof. The bottom plate 17, for example, is mounted by means of four bolts 18 extending through longitudinal slots 19 in the ends of the plate 17 and secured to the housing bottom 14. These slots 19 extend longitudinally of the plate 17 and the bolt heads have a larger diameter than the slot width so that the plate is restrained at the ends from movement away from the housing bottom but the plate slidably engages the bolt heads so as to be limitedly movable longitudinally of the housing. The upper plate 16 is similarly mounted by bolts 21. Provision is made for flexing the center portions of the plates 16 and 17 by plate control means 22 which in the embodiment particularly illustrated in FIGS. 2 and 3 is comprised as an elongated threaded shaft 23 extending vertically through the housing near the center thereof. The shaft 23 has the upper portion 24 thereof externally threaded as, for example, with a right-hand thread, and the bottom portion 26 thereof externally threaded oppositely as, for example, by a left-hand thread. The shaft 23 is in fact formed of two separate portions 24 and 26 joined together at the center by a tongue and groove connection, as illustrated. The threaded shaft 23 extends through the top and bottom 13 and 14 of the housing and is mounted at the top and bottom of the housing for free rotation as by means of collars 27 and 28 secured to the housing and having, for example, set screws extending into annular grooves in the shaft.

Within the housing 11 the plate control 22 includes a first travelling nut 31 threaded onto the upper portion 24 of the shaft and disposed between the top 13 of the housing and the upper plate 16, preferably in attachment with plate 16. A second travelling nut 32 is threaded onto the lower portion 26 of the shaft between the plat 17 and the bottom 14 of the housing, preferably in attachment with the plate 17. Not only are the interior plates 16 and 17 of the present invention flexible but also they are formed of a resilient material such as, for example, a thin sheet of stainless steel or other metal. Thus the normal position of the plates 16 and 17 are flat against the top and bottom of the housing and only by resilient deformation are the plates moved away from the housing. The threaded shaft 23 extends through the plates 16 and 17 with the travelling nuts 31 and 32 bearing on the outside of the plates and thus, upon rotation of the shaft 23, the travelling nuts will be forced toward each other for one direction of shaft rotation to thus resiliently deform the plates 16 and 17 to move them closer to each other at their centers. Reverse rotation of the shaft will allow the plates to urge the travelling nuts away from each other toward the top and bottom of the housing so that the plates thus move away from each other at their centers. With the travelling nuts secured to the plates, the latter will be drawn toward the housing as the shaft is rotated to retract the nuts. Of course the nuts must be prevented from rotating with the shaft.

Exteriorly of the housing 11 there are provided indicating means 36 for indicating the position of the plates within the housing at various rotated positions of the shaft 23. These indicating means may include a travelling nut or the like 37 threaded on the upper portion of the shaft 23 and having an arm extending outwardly into indicating relationship with a vertical scale 38 mounted upon the top of the housing. The indicator arm 39 may also extend on the other side of the travelling nut 37 to loop about a vertical post 41 so that the nut 37 does not rotate with the shaft but instead is constrained to move only up and down as the shaft is rotated. A knob or the like 42 may be provided atop the threaded shaft 23 to facilitate turning of the shaft for adjustment of the position of the flexible plates 16 and 17 within the housing.

It will be seen that with the foregoing structure rotation of the shaft 23 will cause the flexible plates 16 and 17 to be moved toward or away from each other at the centers of the plates; furthermore that such movement is accommodated by above-described plate mounting at the ends of the plates. This will then be seen to provide a variable flow structure within the housing wherein the cross sectional area of the housing between the plates 16 and 17 at the centers thereof is variable by the plate control means 22. The plates 16 and 17, as noted above, have the same width as the interior of the housing so that they fit against the housing side 12 in any deformed plate position. The structure illustrated and described above may, for example, be termed a variable venturi wherein the throat area thereof is adjustable in size.

There is further provided by the present invention an opening 46 extending through the center of one side wall 12 laterally of the threaded shaft 23. This opening is thus located at what may be termed the throat 47 of the variable flow structure. Another opening 48 is provided through a side of the housing in vertical alignment with the opening 46 but displaced therefrom toward the inlet end of the housing.

Measurement, recording and/or control of flow is provided herein by connections 46' and 48' extending externally of the housing from openings 46 and 48 respectively to a differential pressure indicator 49, for example. The indicator 49 may comprise a simple "U-tube," a recording device, or control means operating the plate control means 22, or other means of regulation such as a speed control, in accordance with variations in differential pressure from a predetermined value. The housing opening 48 is disposed upstream of the plates so as to sample fluid pressure ahead of the constriction formed by the plates.

Figure 1:
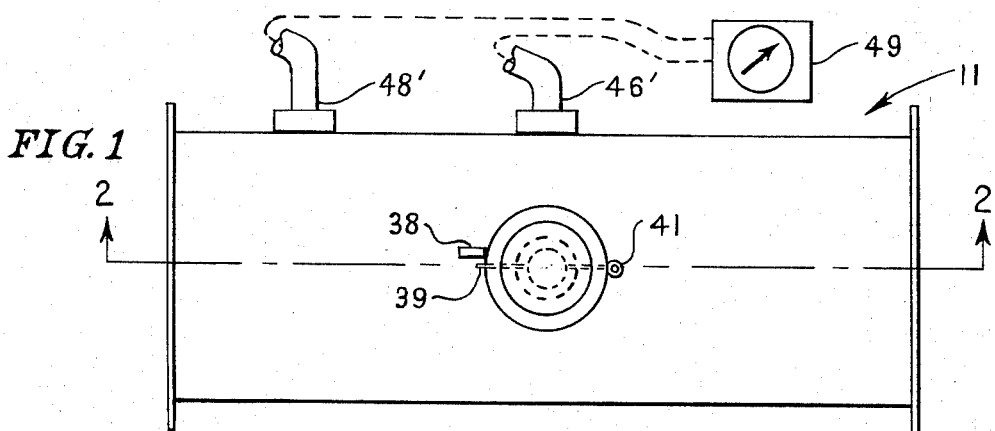
FIG. 1 is a plan view of a flow measurement and control system in accordance with the present invention.

With regard to utilization of the present invention, it is noted that the housing 11 is adapted for connection in a fluid flow system wherein flow is assumed to be from left to right in the illustrations of the invention in FIGS. 1 to 3. The internal cross sectional dimensions of the housing 11 are made equal to such dimensions of conduits of the system within which the present invention is located. Thus the housing itself does not provide a fluid flow constriction but instead the flexible plates 16 and 17 within the housing are employed to establish a desired restriction. With the housing so mounted the plate control means 22 are operated by turning the threaded shaft 23 so as to move the plates 16 and 17 toward or away from each other. It will be appreciated that as the plates 16 and 17 are moved toward each other the internal cross sectional area of the housing is reduced to thus reduce fluid flow through the housing.

Consequently the present invention clearly provides for controlling the flow of fluid therethrough. It is furthermore provided by the present invention that this volume of flow shall not only be controllable but also shall be measured so that an operator may control the flow to achieve any desired volume thereof. In this respect reference is made to FIG. 5 illustrating a family of curves relating settings of the plate or percentage openings of the device to percent of rated flow and pressure difference between the device openings 46 and 48. In operation of the device an operator employs curves such as those illustrated in FIG. 5 and knowing the rated flow with the device fully open he adjusts the plate control 22 to some percentage of total opening as read upon the indicating means 36 so that the indicated pressure differential on the indicator 49 when read off the appropriate curve will give the desired percentage of rated flow or by multiplying the actual flow for that setting. This then precludes prior art necessity of tedious and time consuming separate adjustments of dampers or the like and separate measurements of flow following each setting. It is also to be appreciated that it is possible to provide an individual curve showing cubic feet per minute versus pressure difference for any particular device and such a curve may also be employed by an operator using the present invention.

There has been described above a particular preferred embodiment of the present invention; however, it is to be noted that numerous modifications and variations thereof are possible within the scope of the present invention. Thus, for example, the plate control means 22 may be formed in a variety of ways. The use of a threaded shaft 23 extending through the center of the housing 11 is advantageous and it is noted that same does not materially affect the flow of fluid through the device. Under circumstances wherein it may be desired to either simplify the structure of the present invention or for some reason or other not to provide any obstruction whatsoever in the throat of the device as by extension of a shaft therethrough, there may be provided separate shafts extending into the housing from top and bottom respectively but not connected together. In this respect, reference is made to FIG. 6, for example, wherein there is illustrated the housing 11 having the plates 16 and 17 mounted therein as described above. With respect to these plates it is noted that, while same may be preferably provided as resilient metal plates, for example, it is also possible to employ other materials therefor such as, for example, an impregnated heavy cloth or the like but in such case provision must be made for forcibly drawing the center of the plates back toward the top and bottom of the housing when it is desired to expand the central opening through the device. In the illustration of FIG. 6 there is provided a short shaft 51 extending through the top 13 of the housing and attached as by threaded engagement to an expanded inner end or nut 52 that engages plate 16 above same at the center thereof. A collar 53 is disposed about the shaft atop the housing and is secured to the housing. A set screw 54 is threaded laterally through the collar 53 to engage the shaft 51 which is otherwise slidably mounted in the collar so as to be movable into and out of the housing. Tightening of the set screw 54 sets the position of the shaft and thus the position of the center of the plate 16 within the housing.

A similar shaft and mounting may also be provided through the bottom 14 of the housing for engagement with the plate 17 or, alternatively, there may be provided structure such as illustrated and including a threaded shaft 56 extending through the bottom 14 of the housing in axial alignment with the upper shaft 51. The inner end of the shaft 56 carries an enlarged end 57 in freely rotatable relation thereon. The shaft 56 extends through the bottom of the housing and extends in threaded relation through a collar 58 fixed to the housing exteriorly thereof. A knob or disc or the like 59 at the end of the shaft 56 may be provided for ready gripping of the shaft to rotate same and there may be provided indicating means 61 formed, for example, in the manner of the indicating means 36 described above.

The embodiment of the invention illustrated in FIG. 6 and briefly described above is employed in much the same manner as the embodiment of the invention previously described. It is, however, possible in employing the embodiment of the invention of FIG. 6 to set the position of the upper shaft 51 and then to vary the position of the lower shaft so as to vary the throat opening 47 between the plates 16 and 17. This may then result in the opening being somewhat off center with regard to the housing passage, as illustrated in FIG. 6, but it is found that this does not provide any difficulties insofar as flow control is concerned and does not disturb measurement as long as the throat opening 46 is always disposed between the plates 16 and 17.

Further with regard to possible variations of the present invention from the illustrated and described embodiments, it is noted that the plate control means may be provided as a single turning element located exteriorly of the housing and having extensions connected through the housing walls to engage the flexible plates 16 and 17 within the housing passage. It is also possible in accordance with the present invention to modify or vary the configuration of the internal plates 16 and 17. Thus, for example, these plates may be provided in such a form as to define a flow nozzle of variable opening. In this instance the plates may be provided as rigid members that are, for example, hingedly mounted at upstream ends thereof with the plate control means extending exteriorly of the housing to move the free ends of the plates toward or away from each other. It will be appreciated that the variable venturi configuration of the present invention provides a smoother flow path for fluids through the device than the variable flow nozzle or double damper configuration briefly noted above.

It has been noted above that the present invention may be formed in a variety of different physical configurations. FIGS. 7 and 8 illustrate a rigid plate embodiment of the present invention. With regard to the latter possibility, reference is made to FIGS. 7 and 8 of the drawings wherein there is illustrated a variable flow nozzle embodiment of the present invention. As in the prior embodiments described and illustrated, there is included a housing 11 having a passage 47 therethrough but in this instance variable flow is provided by a pair of plates 61 and 62 pivotally mounted at the inlet end of the housing as, for example, upon shaft 63 and 64 respectively. The plates 61 and 62 are mounted for pivotal motion upon the aforementioned shafts at the inlet end of the housing 11 and are formed with inwardly curving sections 65 and 66, respectively, to a minimum clearance between the plates and thence flare outwardly in tapered sections 67 and 68 respectively. At the entrance end of the housing between the plates, preferably at the center of the housing laterally thereof, there is provided a lateral opening 48 through the housing for connection to one side of a differential pressure measuring means 47 as illustrated in FIG. 1. There is also provide within the housing a second opening 46 which in this instance is located centrally of the housing laterally thereof but disposed between relatively parallel portions of the plates 61 and 62 ahead of the outwardly flaring portions, as illustrated in FIG. 7. Connection is also made from opening 46 to a differential pressure measuring means.

Provision is made for controllably moving the plates or vanes 61 and 62 laterally of the housing toward and away from each other. These means may, for example, comprise a turnbuckle 71 pivotally connected to lever arms 72 and 73 that are affixed to the shafts 63 and 64 pivotally mounting the plates or vanes 61 and 62. The shafts 63 and 64 are rotatably mounted in the top and bottom walls of the housing adjacent the lateral sides of the housing and extend, for example, through the bottom of the housing, as illustrated in FIG. 8. The pivot arms 72 and 73 may extend longitudinally of the housing from the shafts 63 and 64 beneath the housing, again as illustrated in FIGS. 7 and 8. With the turnbuckle or other adjusting means 71 connected between the lever arms 72 and 73, it will be seen that by shortening the turnbuckle it is possible to move the lever arms together and thus to pivot the plates or vanes 61 and 62 toward each other as, for example, into the position shown in dotted lines in FIG. 7.

There is additionally provided in this embodiment of the present invention means for indicating the adjusted positions of the plates or vanes 61 and 62. To this end the lever arm 72, for example, may be elongated longitudinally of the housing to form a pointer 74 as shown in FIG. 7. This pointer may, for example, cooperate with a scale 76 formed, for example, on the undersurface of the housing or attached thereto so that the pointed end of the lever arm will move across the scale as the adjusting means 71 is varied as to length so as to consequently indicate the lateral position of the vanes or plates 61 and 62.

In conformity with he embodiments of the present invention previously described, the vanes or plates 61 and 62 extend completely between the top and bottom walls of the housing and thus fluid entering the housing at the entrance end illustrated at the bottom of FIG. 7 in the drawings will be constrained to pass between these vanes or plates. The curved nature of the vanes or plates 61 and 62 will thus limit fluid flow therebetween and it will be appreciated that movement of these vanes or plates toward each other will further constrict such fluid flow. The flared portions 67 and 68 of the plates 61 and 62, respectively, provide for recovery of pressure following constriction of flow; however, it is herein noted that under certain circumstances such recovery of pressure may not be desirable and in these instances it is possible to eliminate these flared portions 67 and 68. Differential pressure is measured between the housing apertures 48 and 46 and such differential pressure may be employed with a chart as, for example, of FIG. 5 to thus calculate the fluid flow through the embodiment of the present invention illustrated in FIGS. 7 and 8. It is to be noted that in this embodiment the aperture 46 is not located at the throat or minimum area opening of the device. This is particularly advantageous when it is considered that inward movement of the vanes or plates to the position illustrated in dotted lines in FIG. 7 thus also leaves opening 46 displaced from the minimum area opening. With this location of the opening 46, it is necessary to properly calibrate the curves of the graph of FIG. 5, for example, in order to properly determine the fluid flow at different plate or vane separations but difficulties possibly otherwise present by location of the opening at the location of minimum area for varying locations of such area are hereby precluded. It is, of course, possible to locate the opening 46 between the junctions of the curved and flared portions of the plates or vanes at rest position or even at substantially closed position but additional complications are normally included in such an arrangement.

It is to be appreciated that for certain applications of the present invention it may be highly desirable to in fact increase pressure drop across the present invention in at least certain portions of a system employing the invention. Under these circumstances the embodiment of FIGS. 7 and 8 is desirable and for even greater desired pressure drop it is possible, as noted above, to remove the flared portions 67 and 68 so that very little pressure recovery results from passage of fluid through the constriction of the present invention. With the flared portions 67 and 68 removed the downstream or "throat" opening may be located as indicated at 46a of FIG. 7 as the pressure thereat is substantially the same as the throat pressure.

It will be appreciated that each of the embodiments of the present invention illustrated in the drawings of this application and described above are in fact variations of the same invention and furthermore that additional variations and modifications are possible within the scope of the invention. Thus it is not intended to limit the present invention to the foregoing details of illustration or description.

What is claimed is:

1. A fluid flow control and measuring device comprising:

a housing having a rectangular fluid flow passage therethrough, said housing having first and second lateral apertures therethrough for communication of the passage with fluid pressure measurement means, said apertures being spaced along the passage in the direction of fluid flow and said second lateral aperture being disposed centrally of the housing, a pair of control members disposed within the housing passage and each comprising a flexible plate slidably secured to the housing at the plate ends and disposed on opposite sides of the housing passage at said second housing aperture, said members having substantially the same width as said passage, and control means engaging said members and extending exteriorly of said housing in threaded engagement with the plates for moving said members laterally of said passage on opposite sides of said second aperture to thereby vary the effective passage size thereat whereby said control members comprise a venturi of adjustable opening therethrough so that same may be adjusted to establish a desired pressure differential between said first and second apertures for measuring fluid flow under widely varying conditions of flow and, furthermore, said control members are applicable for controlling the flow of fluid through the housing passage.

2. A variable flow device for controlling fluid flow in accordance with measured flow comprising:

a housing having a rectangular fluid flow passage therethrough with a pair of lateral apertures through the housing and spaced apart along the passage, said apertures being adapted for connection to differential pressure measuring and indicating means, said housing having top, bottom and side walls.

3. The device of claim 2 further defined by said control means comprising a shaft extending from the outside of said housing completely through said housing and plates at the center of the plates and normal to the plates, said shaft being secured against longitudinal movement and being mounted for rotation in said housing, said shaft having a first end threaded in one direction and the other end threaded in the opposite direction, and means rigidly affixed to said plates about said shaft in threaded engagement with opposite ends of the shaft whereby rotation of said shaft moves the center of said plates toward or away from each other to vary the throat area of a venturi formed by the plates in said housing.

4. The device of claim 2 further defined by said control means comprising first and second axially aligned shafts extending into said housing from the exterior thereof at the center of said plates and normal thereto, the first shaft being secured to a first of said plates and being slidably mounted in said housing with locking means for setting the shaft position whereby the position of the center of said first plate is adjustable, said second shaft being rotatably mounted in said housing and engaging said second plate whereby the position of the center of said second plate may be precisely adjusted to thus establish a controlled spacing between said plates substantially centered at the middle of said fluid flow passage.

* * * * *